United States Patent

[11] 3,633,085

[72] Inventors Philippe A. R. Rouvre;
Jean E. Pineau; Francois Peroy, all of
Billancourt, France
[21] Appl. No. 960
[22] Filed Jan. 6, 1970
[45] Patented Jan. 4, 1972
[73] Assignees Regie Nationale des Usines Renault
Billancourt, France;
Automobiles Peugeot
Paris, France
[32] Priority Jan. 7, 1969
[33] France
[31] 6900097

[54] INTERMITTENT WINDSHIELD WIPER CONTROL
2 Claims, 5 Drawing Figs.
[52] U.S. Cl. .................................................. 318/443
[51] Int. Cl. ................................................... B60s 1/08
[50] Field of Search .......................................... 318/443

[56] References Cited
UNITED STATES PATENTS
3,492,558 1/1970 Patterson et al. ............ 318/443
3,581,178 5/1971 Kearns ....................... 318/443
3,262,042 7/1966 Amos ......................... 318/443

Primary Examiner—T. E. Lynch
Assistant Examiner—Robert J. Hickey
Attorney—Stevens, Davis, Miller & Mosher ABSTRACT: This control device comprises an amplifier consisting of a transistor associated with a relay, a capacitor inserted in the emitter-base circuit of said transistor and a potentiometer for adjusting the charging time of said capacitor, and switch means for associating said amplifier to a fixed-stop system of a wiper motor, said transistor being held in its saturated condition during the charging time, the input and output of said amplifier being put at the same potential immediately as the motor is started by the action of said fixed-stop system, thus causing the discharge of said capacitor so as to block said transistor and deenergize said relay.

INTERMITTENT WINDSHIELD WIPER CONTROL

The present invention relates to electronic timelag control devices, notably for windscreen wipers of vehicles, of the type providing an intermittent action of the brushes, at will, for instance in case of drizzle, snow or when the road surface is extremely wet, for example.

Various thermal, pneumatic, electronic or other devices have already been proposed to this end. Now thermal devices are objectionable on account of their lack of reliability and are generally ill suited for obtaining relatively long wiping intervals; pneumatic devices are delicate to adjust; electronic devices are free of these inconveniences but hitherto-known devices of this type are relatively complicated and consist as a rule of a pulse generator circuit well separated from the windscreen wiper driving motor, with in most instances one or a plurality of transistors.

It is the object of the present invention to provide an electronic timing control device which avoids the inconveniences set forth hereinabove and is incorporated in the wiring circuit of the windscreen wiper motor, notably a permanent magnet motor. However, this preferred construction should not be construed as limiting this invention for the device of this invention may also be incorporated in more conventional motor types.

This control device, which is applicable to a single-speed or two-speed motor, comprises a switch providing a normal operation and an intermittent operation and is characterized in that it comprises an amplifier consisting of at least one transistor associated with a charging resistor responsive to a relay having its contacts associated with the ON-OFF switch of said motor, a charging capacitor inserted in the emitter base circuit of the transistor, a potentiometer for adjusting the charging time of said capacitor and a switch selectedly connecting said amplifier with said fixed-stop system of the motor and making the timing responsive to the motor circuit. The transistor itself is in a saturated condition during the charging time of the capacitor in order to permit the gradual energization and the deferred action of the relay. The input and output of the amplifier are set at the same voltage when the motor is started in response to the action of the fixed-stop system causing the capacitor to be discharged into the emitter-base circuit so that the transistor becomes nonconductive and thus deenergizes the relay.

Other features and advantages of this invention will appear as the following description proceeds with reference to the accompanying drawing illustrating diagrammatically by way of example three forms of embodiment of the invention given by way of example. In the drawing.

Figure 1:
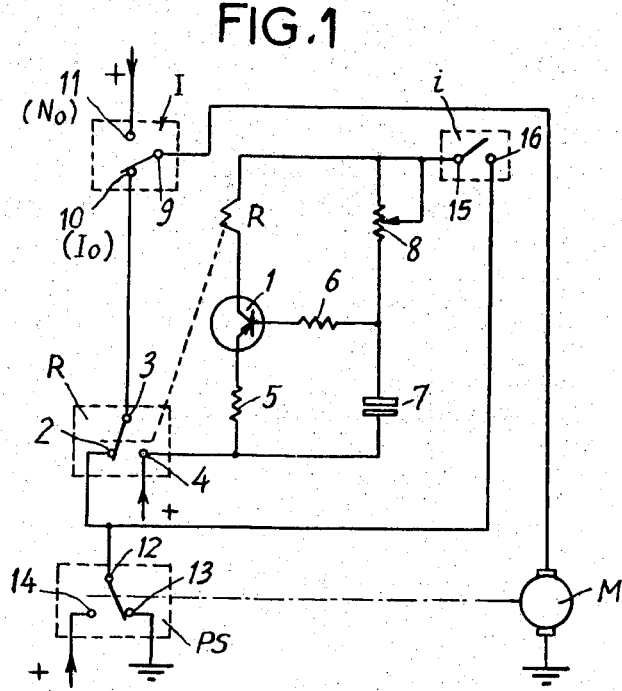
FIG. 1 is a wiring diagram of a first form of embodiment of the timing control device of this invention.

Referring to FIG. 1, it will be seen that the windscreen wiper driving motor M has a parking changeover switch PS having a switch of known type with a reversing contact mechanically connected to the motor. One terminal of the motor is grounded and the other terminal is connected to a changeover switch I providing a normal operation position No and an intermittent operation position Io. The amplifier comprises a transistor 1 in series with an electromagnetic or thermal relay R having movable contact 3 and fixed contacts 2 and 4, contact 4 being connected to the positive terminal + of the storage battery of the vehicle; the amplifier further comprises a charging resistor 5, a base biasing resistor 6, a charging capacitor 7, a potentiometer 8 and another switch i connected on one side to said potentiometer 8 and on the other side to the parking changeover switch PF and to fixed contact 2 of relay R.

In the case of a single-speed motor the device operates as follows:

In the inoperative condition, shown in FIG. 1; the switch I is in the "intermittent operation" position at 9, 10, the movable contact of relay R is at 2, 3, the contact of the parking changeover switch PF is in position 12, 13, with the contact 13 grounded, and the motor is short circuited on itself, i.e. in the position having permitted and caused the braking of the motor rotor in the end position of the wipers (not shown).

Figure 2:
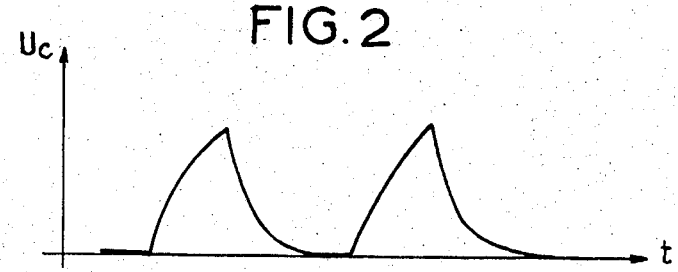
FIG. 2 is a diagram showing the evolution as a function of time of the voltage across the charging capacitor terminals.
Figure 3:
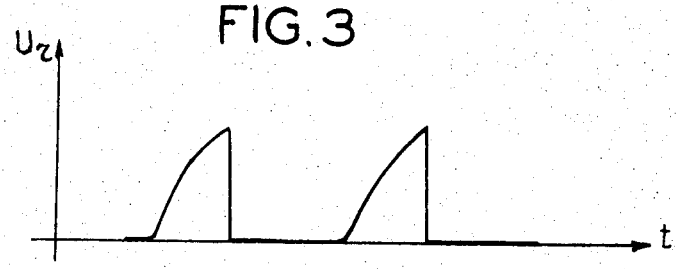
FIG. 3 is a diagram showing the evolution of the voltage across the relay terminals.

Closing the switch i will close the circuit 15, 16 and 12. Transistor 1, relay R and charging capacitor 7 of the amplifier unit are energized, as this circuit is connected at one end to the positive terminal + of the battery via contact 4 of relay R, and at the other end through circuits 15, 16, 12 and 13 to ground. As the charging voltage of capacitor 7 increases (as adjusted by means of the potentiometer 8), the voltage $U_r$ across the terminals of the coil of relay R increases gradually up to the trigger threshold of this relay (FIG. 3). When the trigger voltage is attained, relay R causes its movable contact to switch from 3-2 to 3-4, thus energizing the motor M via contacts 4, 3 and 10, 9. As it begins to rotate, the motor rotor causes the parking changeover switch PF to move from 12, 13 to 12, 14, contact 14 being connected to the positive terminal + of the battery. Thus, immediately as the motor is energized, the amplifier is short circuited on itself, as the voltage difference between its input and output is practically zero. Under these conditions, the charging capacitor 7 (of which the voltage variation $U_c$ is shown in FIG. 2) is discharged through the charging resistor 5, the emitter-base junction of transistor 1 and the base biasing resistance 6. Thus, relay R is deenergized, and the motor circuit is established through contacts 14, 12, 2, 3 and 10, 9. When the motor has accomplished one revolution the parking changeover switch PF is switched from 14, 12, to 12, 13, thus braking the motor and creating a potential difference across the terminals of the amplifier which resumes a cycle.

Figure 4:
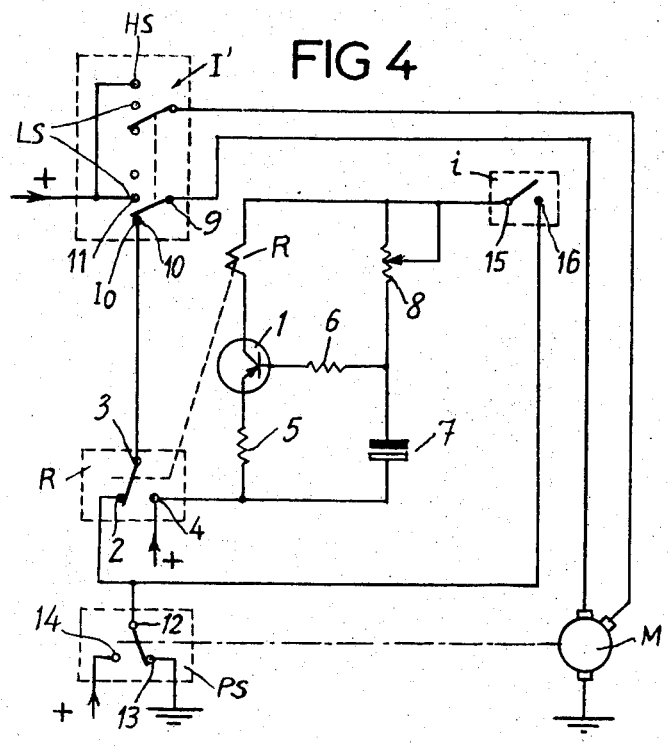
FIG. 4 is a diagram showing a typical form of embodiment of this invention in the case of a motor providing two wiper speeds.

FIG. 4 illustrates the wiring diagram of an alternate form of embodiment in the case of a two-speed motor. In this circuitry the switch I of FIG. 1 is replaced by a three-way switch I' providing the intermittent operation Io, low-speed operation LS and high-speed operation HS, respectively.

Figure 5:
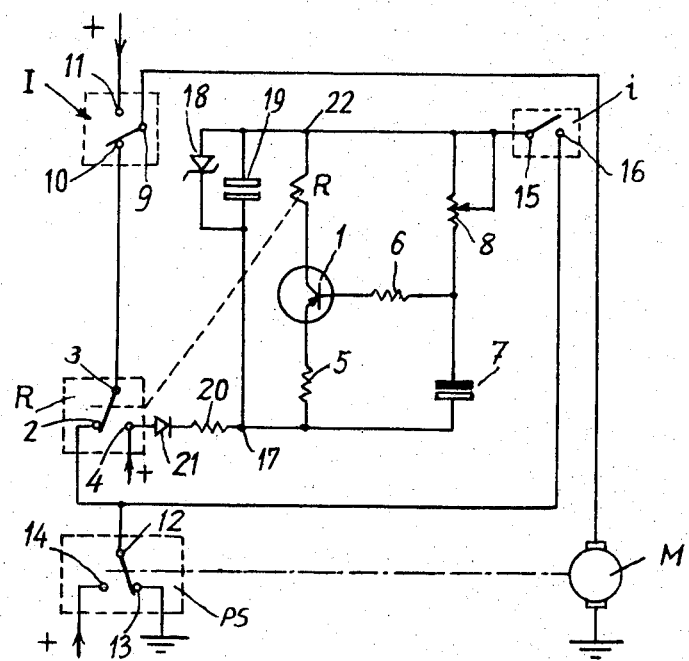
FIG. 5 is a diagram showing a modified form of embodiment of the invention, with a voltage stabilizer.

FIG. 5 illustrates a modified form of embodiment of the amplifier provided with a Zener diode voltage stabilizer. This stabilizer comprises a Zener diode 18 and a capacitor 19 connected in parallel between points 17 and 22. A diode 21 in series with a regulating resistor 20 is interposed between contact 4 and point 17. This diode 21 is provided for blocking the capacitor 19 and permits the discharge of this capacitor only through the amplifier, thus providing a timelag in the release of relay R and therefore an improved operation of the control device.

What is claimed as new is:

1. An electronic timing control device for controlling vehicle windscreen wipers, which are driven by electric driving motor means, during intermittent operation of said wipers, said device comprising first switch means for selecting normal continuous operation, with said motor means directly connected to a power source, and intermittent operation of the wipers, with said motor means connected to said power source through said device; second switch means mechanically controlled by said motor to be connected to ground when the motor means is stopped and connected to said power source when said motor means is running; a relay having a movable contact connected to said first switch means, a first fixed contact connected to said second switch means, and a second fixed contact connected to said power source; amplifier means for energizing said relay, said amplifier means comprising at least one transistor, a charging capacitor connected in the emitter-base circuit of said transistor, which circuit is connected to said second fixed contact, and a charging time adjusting variable resistor connected between the transistor base and a circuit formed by the transistor collector and the relay, said transistor being mounted with a common emitter to serve as a current amplifier, said relay being connected in the collector circuit of said transistor; and normally open third switch means which, when closed, connects said amplifier to ground through said second switch means thus causing charging of said capacitor charging and delayed energization of said relay, the actuation of said relay causing short circuiting of said transistor when the motor means is running, said capacitor then discharging, and the relay then deenergizing.

2. A control device according to claim 1, further comprising a voltage stabilizer having a Zener diode and a capacitor mounted in parallel and connected across the terminals of a circuit comprising said relay in series with said transistor.

* * * * *